(12) United States Patent
Murphy et al.

(10) Patent No.: US 9,046,669 B2
(45) Date of Patent: Jun. 2, 2015

(54) HARDWARE AND METHODS FOR SECURE ALARMED ARMORED PROTECTIVE DISTRIBUTION SYSTEMS AND MANAGEMENT

(71) Applicant: Network Integrity Systems, Inc., Hickory, NC (US)

(72) Inventors: Cary R. Murphy, Hickory, NC (US); Mark K Bridges, Hickory, NC (US); Joseph Giovannini, Hickory, NC (US); David Thompson, Hickory, NC (US); David E. Vokey, Sidney (CA)

(73) Assignee: Network Integrity Systems Inc., Hickory, NC (US)

( * ) Notice: Subject to any disclaimer, the term of this patent is extended or adjusted under 35 U.S.C. 154(b) by 0 days.

(21) Appl. No.: 14/043,326

(22) Filed: Oct. 1, 2013

(65) Prior Publication Data

US 2014/0153889 A1 Jun. 5, 2014

Related U.S. Application Data

(60) Provisional application No. 61/708,412, filed on Oct. 1, 2012.

(51) Int. Cl.
*G02B 6/00* (2006.01)
*G02B 6/44* (2006.01)

(52) U.S. Cl.
CPC ........................................ *G02B 6/44* (2013.01)

(58) Field of Classification Search
CPC .... G02B 6/4452; G02B 6/3897; G02D 5/353; G01B 11/18; G01N 21/7703; G01D 5/353
USPC ........ 385/134, 147, 12, 13; 340/545.4, 545.6; 49/506
See application file for complete search history.

(56) References Cited

U.S. PATENT DOCUMENTS

| 6,133,842 | A   | * | 10/2000 | Gariepy ........................ 340/689 |
|-----------|-----|---|---------|-------------------------|
| 7,092,586 | B2  |   | 8/2006  | Vokey et al.            |
| 7,120,324 | B2  |   | 10/2006 | Murphy et al.           |
| 7,142,737 | B1  |   | 11/2006 | Murphy et al.           |
| 7,206,469 | B2  |   | 4/2007  | Murphy et al.           |
| 7,333,681 | B2  |   | 2/2008  | Murphy et al.           |
| 7,376,293 | B2  |   | 5/2008  | Murphy et al.           |
| 7,403,675 | B2  |   | 7/2008  | Murphy et al.           |
| 7,634,387 | B2  |   | 12/2009 | Murphy et al.           |
| 7,693,359 | B2  |   | 4/2010  | Murphy et al.           |
| 7,706,641 | B2  |   | 4/2010  | Murphy et al.           |
| 8,094,977 | B2  |   | 1/2012  | Murphy et al.           |
| 8,233,755 | B2  |   | 7/2012  | Murphy et al.           |
| 2009/0115607 | A1 | * | 5/2009 | Beinhocker ................ 340/541 |
| 2011/0241881 | A1 | * | 10/2011 | Badinelli .................... 340/541 |
| 2012/0068846 | A1 | * | 3/2012 | Dalzell et al. ............. 340/545.1 |
| 2014/0139337 | A1 | * | 5/2014 | Piper et al. ................ 340/541 |

* cited by examiner

*Primary Examiner* — Ellen Kim
(74) *Attorney, Agent, or Firm* — Adrian D. Battison; Ade & Company Inc.

(57) ABSTRACT

A fiber optic network has alarmed fiber optic lines in the cables connecting a secured junction box to plural user lock boxes. An outgoing alarm line and return alarm line in each cable connect the junction box to each user box. The outgoing alarm line is looped to the return alarm line inside the user lock box. The return alarm line is looped to the outgoing alarm line of a different cable inside the junction box to interconnect a plurality of alarm lines passing through a plurality of user boxes. A detector detects an alarm signal in the connected alarm lines to trigger an intrusion alarm. Power to the components in the box is disconnected when the box is opened and ventilation openings to the box are closed when the box is closed.

21 Claims, 4 Drawing Sheets

HARDWARE AND METHODS FOR SECURE ALARMED ARMORED PROTECTIVE DISTRIBUTION SYSTEMS AND MANAGEMENT

This application claims the benefit under 35 USC 119(e) of Provisional Application 61/708,412 filed Oct. 1, 2012, the disclosure of which is incorporated herein by reference.

This invention relates to a protective distribution system for fiber optic cables.

BACKGROUND OF THE INVENTION

Reference is made to the following patents which may be related to this matter, all assigned to the present applicants, the disclosures of each of which are incorporated herein by reference:
U.S. Pat. No. 8,233,755 issued Jul. 31, 2012
U.S. Pat. No. 8,094,977 issued Jan. 10, 2012
U.S. Pat. No. 7,693,359 issued Apr. 6, 2010
U.S. Pat. No. 7,706,641 issued Apr. 27, 2010
U.S. Pat. No. 7,634,387 issued Dec. 15, 2009
U.S. Pat. No. 7,403,675 issued Jul. 22, 2008
U.S. Pat. No. 7,376,293 issued May 20, 2008
U.S. Pat. No. 7,206,469 issued Apr. 17, 2007
U.S. Pat. No. 7,120,324 issued Oct. 10, 2006
U.S. Pat. No. 7,092,586 issued Aug. 15, 2006
U.S. Pat. No. 7,333,681 issued Feb. 19, 2008
U.S. Pat. No. 7,142,737 issued Nov. 28, 2006
U.S. Pat. No. 7,120,324 issued Oct. 10, 2006
U.S. Pat. No. 7,634,387 issued Dec. 15, 2009

In particular in respect of the above, particular attention is directed to U.S. Pat. No. 7,142,737 which shows monitoring of single mode fibers and U.S. Pat. No. 7,092,586 which shows monitoring of multi-mode fibers where the systems disclosed are suitable for the monitoring systems disclosed herein.

Also U.S. Pat. No. 7,706,641 discloses a loop back system which allows monitoring of multiple fibers using a single monitoring system, the arrangement of which is particularly applicable herein.

Data is sent to computers or sent among computers by electromagnetic transmission through the air (e.g., laser or Wi-Fi), or is sent through wires (typically copper or aluminum), or is sent by fiber optic cables. The transmitted data must be protected in order to guard against intruders intercepting data as it is transmitted. The transmitted data may be encrypted, but encryption impedes potential use of the data and does not restrain the interception of the data in the first place. Encryption also requires time and equipment to encrypt the data, and to decrypt the data, thus increasing expense and causing delays in transmitting and using the data. Since data transmitted over the airways is subject to interception, data transmission over wires or optical cables provides improved resistance to interception.

There is thus a need for an improved way to monitor data transmission between computers or to computers. The U.S. Government need for security and the related development of SIPRNET, JWICS and other secure networks reflects this need for improved ways to prevent data interception or to monitor data to give an alarm when attempts are being made to intercept the transmitted data.

Protective distribution systems are used to deter, detect and/or make difficult the physical access to the communication lines carrying data, especially national security information. Approval authority, standards, and guidance for the design, installation, and maintenance for protective distribution system are stated in NSTISSI 7003. The requirements of this publication apply to U.S. government departments and agencies and further apply to contractors and vendors of these government departments and agencies. Hardened protective distribution systems provide significant physical protection and are typically implemented in three forms:
 a—Hardened Carrier protective distribution systems,
 b—alarmed carrier protective distribution systems and
 c—Continuously Viewed Carrier protective distribution systems.

In a hardened carrier protective distribution system, the data cables are installed in a carrier constructed of electrical metallic tubing (electrical metallic tubing), ferrous conduit or pipe, or ridged sheet steel ducting. All of the connections of the tubing, conduit etc. in a hardened carrier system are permanently sealed around all surfaces with welds, epoxy or other such sealants. If the hardened carrier is buried under ground, in order to secure cables running between buildings for example, the carrier containing the cables is encased in concrete. The only way to access the data transmission lines is to break through the enclosing physical barrier, and doing so leaves signs of the intrusion which can be detected.

With a hardened carrier system, detection of attempts to intercept the transmitted data is accomplished by human inspections that are required to be performed periodically. Visual inspection requires that hardened carriers be installed below ceilings or above flooring so the physical structure enclosing the data transmission lines can be visually inspected to ensure that no intrusions have occurred. These periodic visual inspections (passive visual inspections) occur at a frequency dependent upon the level of threat to the environment, the security classification of the data being transmitted, and the access control to the area being inspected. Such inspections are costly, subject to inspection error which fails to detect intrusions, and limits the location of the data carrier.

Legacy alarmed carrier systems monitor the carrier containing the data transmission cables being protected. More advanced systems monitor the fibers within the carrier, or are made intrinsic to the carrier, with the cables being protected by turning those cables into sensors, which sensors detect intrusion attempts. But again, such systems are expensive to install, especially if the wire cables serve the dual purpose of acting as intrusion sensors while others transmit data.

Depending on the government organization, using an alarmed carrier protective distribution system in conjunction with suitable protection at cable junctions may, in some cases, allow for the elimination of the carrier systems altogether. In these instances, the cables being protected can be installed in existing conveyance mechanisms (wire basket, ladder rack) or installed in existing suspended cabling (on D-rings, J-Hooks, etc.).

A Continuously Viewed Carrier protective distribution system is one that is under continuous observation, 24 hours per day (including when operational). Viewing circuits may be grouped together to show several sections of the distribution system simultaneously, but should be separated from all non-continuously viewed circuits in order to ensure an open field of view of the needed areas. Standing orders typically include the requirement to investigate any viewed attempt to disturb the protective distribution system. Usually, appropriate security personnel are required to investigate the area of attempted penetration within 15 minutes of discovery. This type of hardened carrier is not used for Top Secret or special category information for non-U.S. Continuous viewing of the data distribution system is costly and subject to human error.

Simple protective distribution systems are afforded a reduced level of physical security protection as compared to a Hardened Distribution protective distribution system. They use a simple carrier system (SCS) and the following means are acceptable under NSTISSI 7003:

(1) the data cables should be installed in a carrier;

(2) The carrier can be constructed of any material (e.g., wood, PVT, electrical metallic tubing, ferrous conduit);

(3) the joints and access points should be secured and be controlled by personnel cleared to the highest level of data handled by the protective distribution system; and (4) the carrier is to be inspected in accordance with the requirements of NSTISSI 7003. However this approach also requires high costs, inspections, and manual inspections.

Increasing bandwidth and security demands in Local Area Networks (LAN) are leading to a shift from copper to fiber optic materials to carry the transmitted data. This increased bandwidth will also require Fiber-to-the-Desk (FTTD) as part of the required local area network. The term fiber-to-the-desk is used to describe the (usually) horizontal orientated cabling in the areas of data transmissions and telecommunication, which leads from the floor distributor to the outlets at the workplace on that floor, providing fiber-optic cable transmission to each desktop computer. In the standards ISO/IEC 11801 and EN 50173 this is the tertiary level.

In a secure fiber optic network application, Tactical Local Area Network Encryption TACLANE) is a network encryption device developed by the National Security Agency (NSA) to provide network communications security on Internet Protocol (IP) and Asynchronous Transfer Mode (ATM) networks for the individual user or for enclaves of users at the same security level. Tactical local area network encryption allows users to communicate securely over legacy networks such as the Mobile Subscriber Equipment (MSE) packet network, Non-Secure Internet Protocol Router Network (NIPRINet), Secret Internet Protocol Router Network (SIPRNet), and emerging asynchronous transfer mode networks. The tactical local area network encryption limits the bandwidth of a secure fiber optic network to 1 to 10 Gb/s depending on the type network. Providing a secure alarmed protective fiber distribution system enables removing the tactical local area network encryption thereby allowing for 40 Gb/s network systems with that higher data rate provided directly to each desktop.

Approval authority, standards, and guidance for the design, installation, and maintenance for protective distribution system are provided by NSTISSI 7003 to U.S. government departments and agencies and their contractors.

The present invention uses a Protective Distribution System (PDS) solution that can provide Secure Physical Network Security Infrastructure Solution for Secure Passive Optical Network (SPON), Gigabit Passive Optical Network (GPON), and Fiber to the Desk (FTD) in Intrusion Detection of Optical Communication Systems (IDOCS) applications.

The present invention can be customized to each application. The disclosed method and apparatus provide an end to end solution for Secure Passive Optical Networks (SPON), for Gigabit Passive Optical Network (GPON), and Fiber to the Desk (FTTD) is provided for Intrusion Detection of Optical Communication Systems (IDOCS) applications. This method and apparatus improves the deployment, management and protection of defense critical networks and C4ISR Facilities where open storage areas become a challenge.

While allowing the customization of Intrusion Detection of Optical Communication Systems (IDOCS)), the present method and apparatus uses fiber optic data transfer which provides improved technology over copper data transmission mechanisms where data protection is imperative and data speed necessary.

An alarmed carrier protective distribution system provides a desirable alternative to conducting human visual inspections and may be constructed to automate the inspection process through electronic monitoring with an alarm system. In an alarmed carrier protective distribution system, the carrier system is "alarmed" with specialized optical fibers deployed within the conduit for the purpose of sensing acoustic vibrations that usually occur when an intrusion is being attempted on the conduit in order to gain access to the cables. But such alarmed systems have been previously used only in main data transfer conduits between buildings or within computer centers.

The present system significantly refines the application of the fiber optic alarms and applies the alarmed lines to junction boxes and user lock boxes.

An alarmed carrier protective distribution system offers several advantages over hardened carrier protective distribution system, including (1) providing continuous monitoring, day and night, throughout the year; (2) eliminating the requirement for periodic visual inspections; (3) allowing the carrier to be placed above the ceiling or below the floor or in other difficult to access locations, since passive visual inspections are not required; (4) eliminating the requirement for concrete encasement outdoors; (5) eliminating the need to lock down manhole covers; and (6) enabling rapid redeployment or modification for evolving network arrangements. While offering numerous advantages, such systems are expensive to install.

SUMMARY OF THE INVENTION

A protected distributed fiber optic network is provided that allows the transmission of encrypted or non-encrypted data to user terminals at 40 Gbps rates while meeting current government security requirements. The protected distribution fiber optic network has alarmed fiber optic lines in the cables connecting a secured junction box to each of a plurality of secured user lock boxes. An outgoing alarm line, a return alarm line and a data line in each cable connect the junction box to each user box. The outgoing alarm line is looped to the return alarm line of the same cable and looped inside the user lock box. The return alarm line is looped to the outgoing alarm line of a different cable inside the junction box with repeated looping in the junction box and user box interconnecting a plurality of alarm lines passing through a plurality of user boxes. A detector detects an alarm signal in the interconnected alarm lines to trigger an intrusion alarm.

An alarmed fiber optic distribution network and method is provided which include fiber distribution panels and secure fiber optic secure junction boxes. Fiber optic jumpers or loopbacks allow for the alarming or un-alarming of fiber optic lines, which lines may comprise secret Internet protocol router networks or non-secure Internet protocol router networks for classified or unclassified data transmission used in conjunction with a protective distribution systems. The protective distribution system may have interlocking armored fiber optic cable attaching to secure junction boxes and attaching to secure lock boxes through the use of locking connect sleeves that are affixed to the interlocking armored fiber optic cables and also affixed to the boxes. The interlocking armored cable has the fiber optic lines inside the interlocking armored conduit and such construction is known in the art and not described in detail herein. Such interlocking armored cable is constructed to meet government security regulations suitable for use in transmitting secret data. Tampering with the cables containing the alarmed lines results in a signal transmission to a telecommunications room or other detector, resulting in notice of the tampering, which in turn may lead to various actions depending on the nature of the security and protocol for handling security threats or breaches.

A secure and alarmed protective fiber distribution system is provided that includes locking fiber distribution cabinets in a secure telecommunications room. The telecommunications room advantageously supports an alarming system and an optional alarm patching system. Rack mounted fiber distribution panels located in the telecommunications room connect fiber optic cables to new or to existing networks, and preferably provide the secure alarmed protective fiber distribution system. The interlocking armored fiber optic cable is run from the secure telecommunications room to various locations as desired to support classified and un-classified networks with an alarm point for one or more selected users. The interlocking armored fiber optic cable is fitted with connectors. The cables are run to secure junction boxes which clamp to the connectors on the cable. These secure junction box advantageously, but optionally, are constructed to meet all U.S. Air Force AFI33-201V8 mandatory requirements for protective distribution systems, and to meet any other applicable security requirements.

The fiber optic cables extending from the secure junction box(es) may carry both the classified and un-classified lines in order to give the user the ability to make the entire network classified or any selected portions classified and alarmed or unclassified and not alarmed. From each secure junction box interlocking armored fiber optic cables extend to network users locations, with the cables having connectors that are clamped to a secure classified secure lock box. Depending on the type of network the secure lock box meets all U.S. Air Force AFI33-201V8 mandatory requirements for protective distribution systems or such other security requirements as are applicable. Depending on the type of network (i.e. passive optical network or Fiber to the Desk top fiber to the desk), a user device may be installed inside the secure lock box.

Two cores or lines in the interlocking armored fiber optic cable are used for alarming the various selected boxes and networks or selected portions of networks. Inside the secure junction box fiber jumpers are installed to provide an alarmed fiber optic line from the user fiber distribution panel to the alarm fiber distribution panel inside the telecommunications room so that the selected user terminals or selected networks are connected to the alarming system. Within the secure junction box the alarming core or line loops back the alarm signal to extend the signal to the selected user lock boxes or selected networks. The alarming core or line is not provided for non-secured lines or users or networks.

A protective system and method are disclosed that include fiber distribution panels and secure fiber optic secure junction boxes with the optional use of fiber optic jumpers or loopbacks to allow for the alarming or un-alarming of secret Internet protocol router networks or non-secure Internet protocol router networks to accommodate classified or unclassified data transmission when used in conjunction with a protective distribution system. The protective distribution system has pre-terminated interlocking armored fiber optic cable(s) attaching to secure junction boxes and/or to secure lock boxes with the use of locking connect sleeves that are affixed to the interlocking armored fiber optic cable with epoxy.

The secure junction boxes and secure lock boxes include steel boxes with hidden hinge systems to avoid mechanical, in-line access to hinges. The boxes may have seams that are welded and ground to further inhibit access at the seams. A cable clamping system is preferably installed to accommodate the cable connect locking sleeves that are affixed to each cable. The cable clamp system may allow for pre-terminated, pre-connectorized fiber optic interlocking armored cables to be installed in the box and held such that removal of an optical cable from the box is inhibited and that any such removal will result in visually perceptible damage. A Government Service Agency approved padlock may be used on each secure box for locking and inspection.

There is also provided a factory-manufactured, pre-terminated and pre-connectorized, fiber optic interlocking armored fiber optic cable having at least one pre-terminated and pre-connectorized access location for providing access to at least one pre-terminated and pre-connectorized interlocking armored fiber optic cable connector.

Depending on the application for either passive optical network or fiber to the desk topology, a simplex or duplex fiber may be used for the data transmission. In both topologies, duplex fiber may be used for alarming. In order to maximize the use of the alarming ports, loopback connectors are used in the telecommunications room and/or within the secure junction box in order to extend the duplex alarming fiber to each secret Internet protocol router network user. An additional loopback may be installed within the user secure lockbox to return the alarming loop to the telecommunications room or secure junction box. During the installation the dB signal loss for distances and connections are considered and accommodated using known techniques to compensate for signal loss.

The present invention uses Intrusion Detection of Optical Communication Systems (IDOCS) and is especially useful in areas of a protective distribution system that cannot be visually monitored but still require protection at all times. Such an intrusion detection system requires minimal cost to install and operate when considering the rising costs of installing and maintaining a data encryption system, and the costs of other alternative protection systems. The benefit of using intrusion detection of optical communication systems over other alarmed carrier technology is that it monitors the same fiber or cable that required protection. Further, its COMSEC-specific development negates the false alarm issue that would result from the technology transfer of traditional fence line systems.

The Secure Passive Optical Network (SPON) solution of the present invention is based on the International Telecommunications Union-compliant Gigabit Passive Optical Network (GPON) technology. This solution provides connectivity for one or more of voice, data, video, and secure and non-secure local area networks, secure passive optical network seamlessly integrates analog and digital video, broadband data, and telephone services onto a common platform. It also provides a Layer 2 passive optical distribution system to end users. An Optical Line Terminal (OLT) at the data center provides the interconnection to the secure passive optical network system. Single mode fiber is then used to carry the optical signal to an Optical Network Terminal (ONT) at the user station that provides an intelligent managed demarcation point for network services.

The present invention advantageously uses Gigabit Passive Optical Networks (GPON) to provide a capacity boost in both the total bandwidth and bandwidth efficiency through the use of larger, variable-length packets in passive optical network technology. The gigabit passive optical network is standardized by the requirements of ITU-T G.984 (GPON). While those requirements permit several choices of bit rate, the industry has converged on 2.488 Gbps of downstream bandwidth, and 1.244 Gbps of upstream bandwidth. A Gigabit passive optical network Encapsulation Method (GEM) allows very efficient packaging of user traffic, with frame segmentation to allow for higher quality of service (QoS) for delay-sensitive traffic such as voice and video communications.

The following important features can be used with the system described herein:

There is provided a connection of the monitoring fiber to the door or lid of the lock box whereby opening the lock box causes the monitoring fiber to be disturbed and treated as a detection. The detection can be analyzed as an independent event or is combined with the information that the electronics have been accessed, the combined information used to influence response to the alarm.

The detection monitors the fiber and cable with or without the presence of data.

The Lock box is configured such that power to the electrical and electronic equipment such as a PON ONT is disconnected if box is opened.

Power is disconnected by means of magnetic or mechanical containment of electrical connection.

Connection to a power cord is shielded from emanations when power is disconnected.

The Lock box is designed such that ventilation occurs only when box is open. Operation of electronics within sealed box poses thermal issues, however ventilation holes that are always open are a security risk.

A sliding door covers ventilation holes when lock box is closed.

The Lock box contains battery cells which are charged when primary electronics internal to the lock box are inactive, wherein power is disconnected from mains and applied from the battery cells for intended network use so as to decouple mains power from data equipment that potentially carries controlled access information.

The Lock box is configured with mounting ears for attachment to desk or other surface.

BRIEF DESCRIPTION OF THE DRAWINGS

These and other advantages of the invention will be better understood in view of the following drawings and description, in which like numbers refer to like parts throughout, and in which.

DETAILED DESCRIPTION

Figure 1:
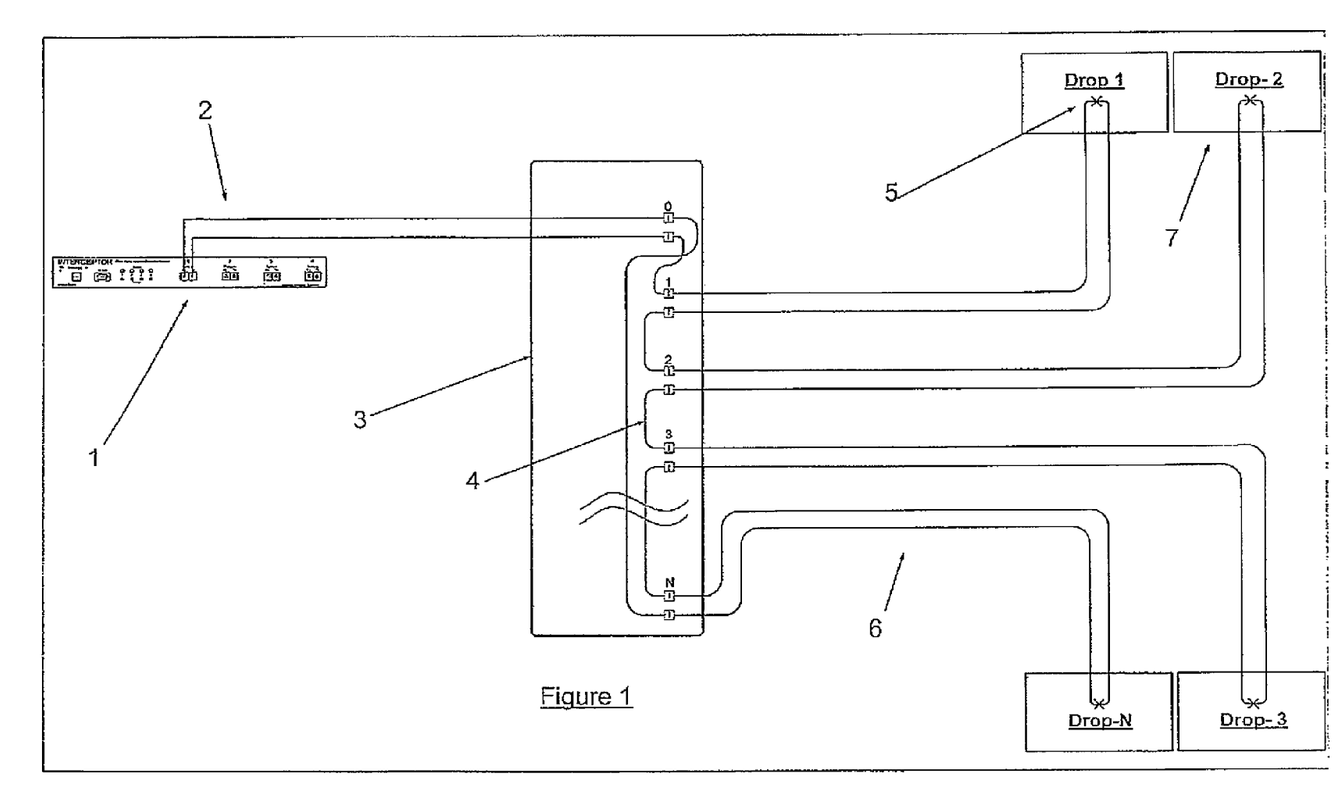
FIG. 1 shows an implementation of the alarmed PDS as described, implementing point to multipoint architecture. In this drawing, a single channel of alarm system is able to monitor multiple cables.

Referring to FIG. 1, a fiber optic distribution system alarming representation is shown. Alarm point 1 monitors one fiber or multiple fibers within a carrier such as a cable. The alarm fiber(s) 2 are connected to a distribution mechanism 3, such as a patch panel. Within the mechanism 3, the alarm signal is distributed to one or multiple user boxes 7 by way of a point-to-multipoint (aka hub and spoke) architecture as shown in U.S. Pat. No. 7,706,641 to which further reference may be made. The monitor signal is looped back to the remote locations by the loopback devices 4 within the distribution mechanism 3, and looped back from the remote locations 7 by remote loopback devices 5 on a single or multiple fibers. That is the cable can include multiple fibers some of which are data fibers and one or more of which are monitoring fibers or a single monitoring fiber can be used and is used in a loop back arrangement as described in the above patent. Yet further, a single fiber can be used for all purposes including all data and all monitoring. The monitoring fibers 6 are present within conveyances such as cables or other carriers, preferably armoured cables. Within these cables where the monitor fibers 6 are present are collocated signal cables for carrying data either presently or in the future.

Figure 2:
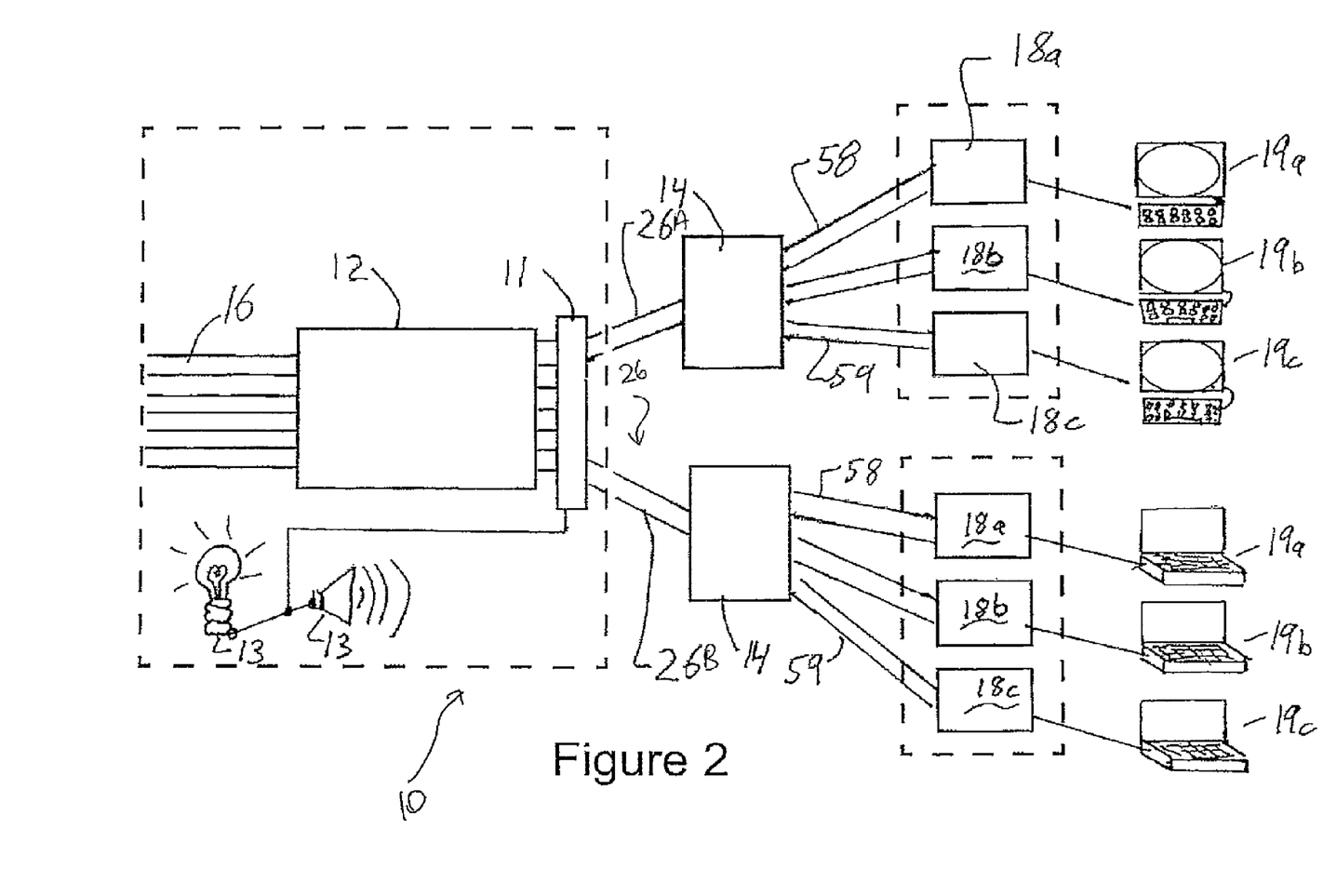
FIG. 2 shows a schematic layout of a typical use of the equipment in one secured room, where the distribution box is located in in a different (non-secure) room, and the drop boxes are located in in a separate (part time) secured room and a fiber optic cable distribution system having secured and non-secured lines.

Referring to FIG. 2, a fiber optic distribution system 10 is shown that includes fiber distribution panels 12 preferably, but optionally located in a distribution point. The panel(s) 12 in the distribution point receive one or more fiber optic cables 16 bearing signals and routes various fiber optic cables 26 from the panel 12 to various locations schematically illustrated in FIG. 2 through various secured boxes 14, 18 and fiber optic cables 58, 59, to end user computer terminals 19A, 19B and 19C The routed data through cables 26 may come from other sources and need not be solely signals received from fiber optic cables 16.

The telecommunications room provides alarm sensors or detector 11 for detecting tampering or unauthorized access to selected cores or lines in any of a plurality of fiber optic cables 26. The detector 11 activates one or more of various signals 13, including audio signals, visual signals, or laser communication signals or telecommunication signals or electronic signals in response to appropriate signals or lack of signals from the selected alarmed cores or lines within cable(s) 26. The alarmed lines are discussed in more detail below.

The fiber optic cables 26 are advantageously routed from the panel 12 to one or more secure fiber optic junction boxes 14 which in turn route fiber optic cables 26 through further fiber optic lines (e.g., 58, 59) to one or more user lock boxes 18A, 18B, 18C connected to user computer terminals 19. If desired, the cables 26 may go directly from the telecommunications room to the user lock box 18. The junction boxes 14 may use fiber optic jumpers or loopbacks to allow for the alarming or un-alarming of secret Internet protocol router networks or non-secure Internet protocol router networks for classified or unclassified data transmission when used in conjunction with a protective distribution systems 10. The protective distribution system 10 uses interlocking armored fiber optic cables 26 attaching secure junction boxes 14 to secure lock boxes 18 with the use of locking connect sleeves that are affixed to the interlocking armored fiber optic cable 26 and the junction boxes 14. If a selected fiber optic line or core is to be secured, then as discussed later, cable 26 carrying that line has two additional alarm lines, one line carrying an alarm signal to one or more selected locations and one line returning an alarm signal from the one or more selected locations. Jumpers may loop back the alarming line to a selected plurality of locations and before connecting to the return alarm line thus forming a loop of interconnected alarm lines that end up back at detector 11 so that interference or tampering with the cables 26 or boxes 14, 18 results in an alarm detection by detector 11.

The present invention thus uses one or more fiber optic lines inside fiber optic cables 26 to alarm the cables and detect intrusions or attempts at intrusion. The detector 11 sends a signal through a fiber optic line and monitors the return signal to detect changes in the monitored optical characteristics that reflect intrusions or cable movement, and preferably identifies the location of the intrusion along the fiber optic cable. Various detectors 11 may be used, with a detector named the Interceptor and sold by Network Integrity Systems in Hickory, N.C., believed suitable for use.

Suitable arrangements for introducing and analyzing the signals are shown in U.S. Pat. No. 7,092,586 in respect of multi-mode systems and in U.S. Pat. No. 7,142,737 in respect of single mode systems, both of which may be used in the current construction.

The cables 26 are preferably pre-terminated (i.e., connectors are attached by the manufacturer) where possible, and are advantageously armored by placing the cables inside a suitable carrier such as an interlocking armored cable, Electrical Metal Tubing (EMT), PVC pipe, or other suitable conduits meeting the security requirements of the particular application. Enclosing the fiber optic cables 26 in such armored conduits increases the sensitivity of the alarming lines because of the physical force needed to breach the conduits and reach the fiber optic lines, and because even the change in ambient light from a hole in the cable may be detected.

Referring to FIGS. 1 and 2, the cable 26 takes the form of one or more data feeds 26 from the telecommunications room which feed data to a secure junction box 14. For illustration, data cable 26A is a classified secret Internet protocol router network data and data cable feed 26b is an unclassified feed. The data feeds 26 are secured fiber optic cables. The junction boxes advantageously conform to U.S. Air Force AFI33-201V8 or other applicable specifications or regulations. The secure junction box 14 is configured to limit access to only authorized personnel, via use of various locking devices including keyed locks, padlocks, or electronic locks which may be unlocked by the authorized personnel. The junction boxes 14 are usually metal with no access other than through locked access doors, lids or panels with access controlled by the locking devices. Attempts at unauthorized entry to the junction box 14 will leave visual indications, or if electronically locked, the electronics may track time, date and personnel accessing the junction boxes 14 or may track attempts to access the junction box. Various electronic motion sensors or force sensors may be used to detect such attempts at access.

The data feed 26A may contain a plurality of lines that may transfer data of differing security levels, with each data transfer line receiving differing security protections. For illustration, feed line 26a includes secure data lines and secret data lines while unsecured feed line 26b includes non-secret and non-secure data lines Each of the data lines is separately connected to a fiber optic patch panel that is preferably rack mounted to allow multiple panel support and many connections. The fiber optic patch panel connects the secure lines 26 to a network using passive optical network (PON) components. The patch panel 12 is advantageously located within or forms a wall of a secured box or facility so that access to the data lines are limited and require access through a tamper evident junction box. Thus, the rack mount fiber patch panel connects data feeds 26 to the new or existing optical line terminal or fiber to the desk network and could also be used for alarm patching. Both classified secret Internet protocol router networks 26a and un-classified non-secure Internet protocol router network 26 are connected to the rack mount fiber patch panel.

The alarming device is also connected to the rack mount fiber patch panel and could be jumper connected to any secure junction box 14. The cables 26 may be pre-terminated (i.e., connectors are attached by the manufacturer) and have interlocking armored fiber jumper cable to connect from the telecommunications room fiber patch panel. Color coded fiber optic connectors may be used to assign the type of connectivity.

The data feeds 26a, 26b may contain any number of fiber optic feeds, some of which are classified or secure or unclassified with the appropriate level of fiber optic line being physically routed to the appropriate user terminal. The fiber optic lines are preferably color coded, with black fiber optic lines or connectors indicating alarming feed for patching classified users, with red fiber optic connectors indicating classified secret Internet protocol router network feed for patching classified users and with green indicating un-classified non-secure Internet protocol router network feed from the telecommunications room. Appropriate fiber optic connectors on data lines provide for connection with other fiber optic lines. The connectors may be color coded as desired, preferably matching the wire colors, with red or black reflecting classified data line connectors and green reflecting non-classified data line connectors.

If the data transmission is interrupted, as by data tampering, theft, damage or other actions affecting the data transmission through the fiber optic cable, the interruption is detected at the telecommunications office by detector 11, which preferably both sends a signal through the outgoing alarm line and receives a signal from the return line in order to identify variations in the signal strength reflecting intrusions, intrusion attempts, and the location of such intrusions or attempts along the length of the alarm lines. This detection assumes that the data transmission of one line in a cable cannot be intercepted without disrupting the signal in the accompanying alarmed lines in the same cable. The jumpers are preferably 4 core pre-terminated and interlocked armored jumpers.

Referring again to FIG. 2, the fiber optic lines 26, 58 have opposing first and second ends extending from, between or through various ones of the boxes 14, 18 and distribution panels 12. The junction boxes 14 are typically the first boxes when the distribution system is viewed along the line of the data flowing through the fiber optic cables and lines within those cables. The user lock boxes 18 are usually the second boxes when the distribution system is viewed along the line of the data flowing through the fiber optic cables and lines within those cables. When the distribution system is viewed in the reverse direction, from the secure box 18, then the user box is the first box and the junction box 14 is the second box, with the network potentially containing further distribution boxes.

The interlocking armored fiber optic cables with the alarming lines and loopback features for each secured user allow the transmission of encrypted or non-encrypted data to user terminals at 40 Gbps rates while meeting current government security requirements. As the capacity of fiber optic cables to carry data increases, the data transfer rate will also increase. This provides a significant improvement over the ability to carry data over copper or other metal lines, while providing the security needed for classified and other secured data transmission. Further, the ability to secure the fiber optic transmission lines without encryption significantly simplifies the system and increases the data transfer rate and the actual speed with which data may be accessed and used by the computers 19 associated with each user lock box.

Figure 3:
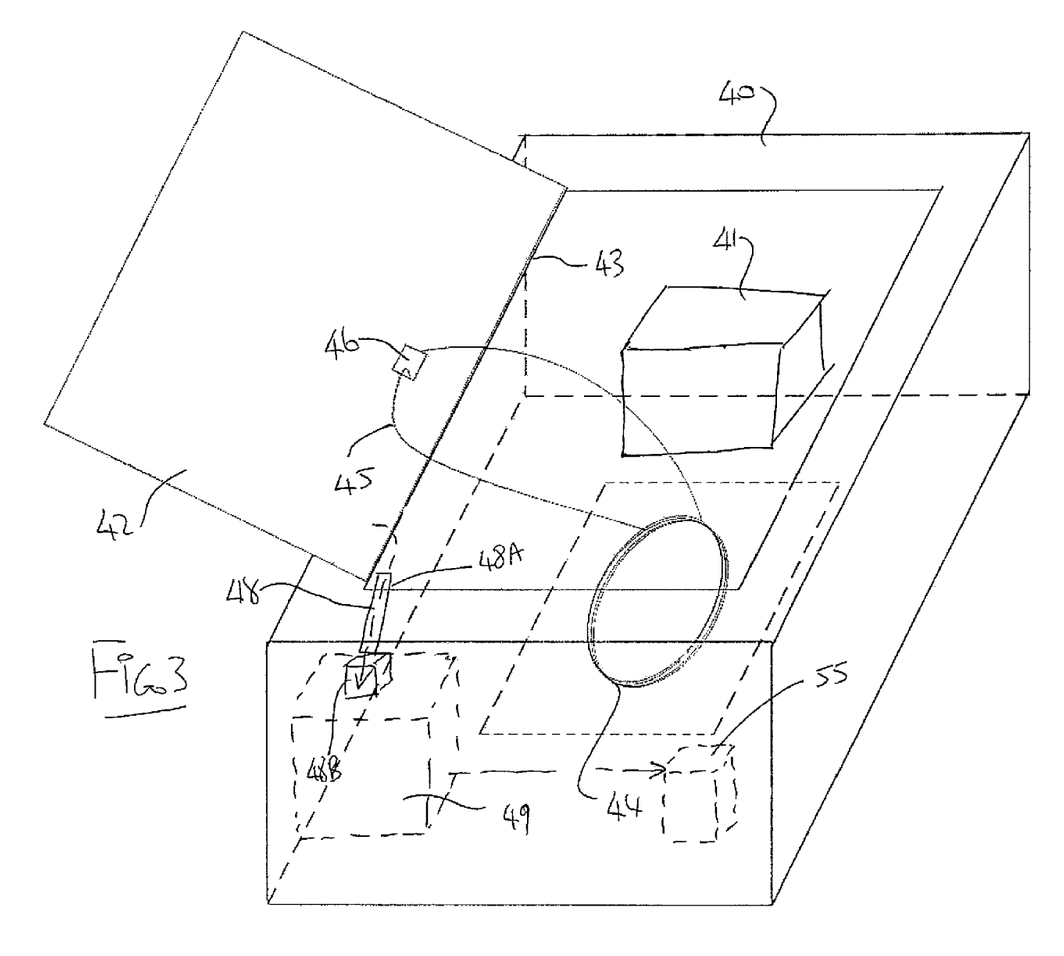
FIG. 3 shows an arrangement in which the opening of the door of the secure box of FIGS. 1 and 2 is monitored by a fiber loop attached to the door and in which power to a power supply for the internal components is disconnected on opening of the door.

In FIG. 3 is shown schematically a construction of secure closed box 40 with a top lid 42 and containing the components 41 which operate on the fiber optic cables connected thereto. The lid is hinged by a hinge 43 along the edge of the lid. There is provided a connection 45 of the monitoring fiber loop 44 to the door or lid of the box by a mounting bracket 45 whereby opening the lock box causes the monitoring fiber to be disturbed and treated as a detection. The detection can be analyzed as an independent event or can be combined with other information from the system that the electronics have been accessed. That is where an authorized access occurs and is detected by the monitoring fiber(s). the combined information is used to influence the response to the alarm so that the alarm is only activated when an unauthorized access occurs.

The detection monitors the fiber and cable with or without the presence of data. That is it is not essential that data either encrypted or non-encrypted is present on the fiber The secure box is can be configured such that power to the electrical and electronic equipment such as a PON ONT is disconnected if box is opened. This is shown schematically in FIG. 3 where the lid 42 is connected by a mechanical link 48 to the power supply 49 by which the opening of the box cuts off the power supply to the components 41 or physically blocks or otherwise impedes attachment of the power cord. The power can be disconnected by means of magnetic or mechanical containment of electrical connection such as is used in some Apple computers. Connection to the power cord is shielded from electromagnetic emanations using conventional shielding arrangements when power is disconnected.

Figure 4:
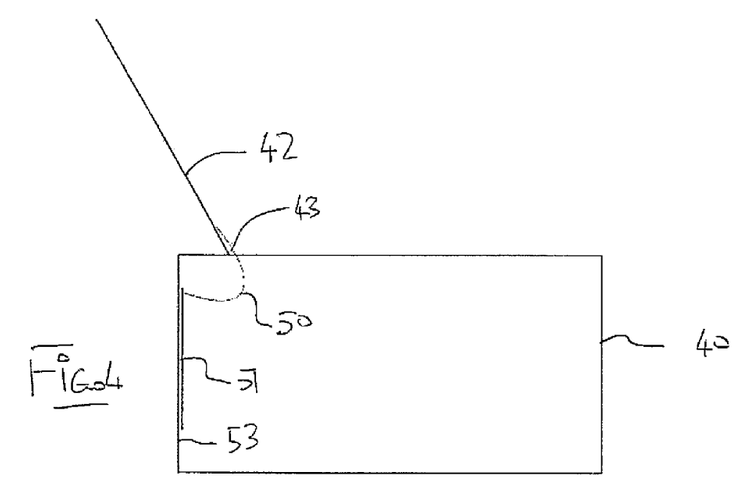
FIGS. 4, 5 and 6 show side elevational and rear elevational views of an arrangement in which the opening of the door of the secure box of FIGS. 1 and 2 activates opening and closing of vent openings so that the box is fully closed without ventilation which the lid is closed.
Figure 5:
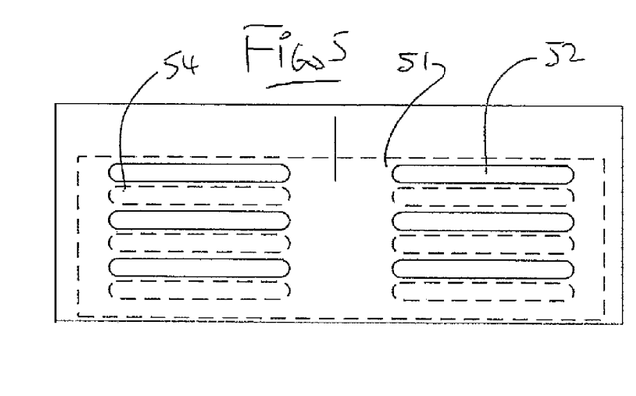
Figure 6:
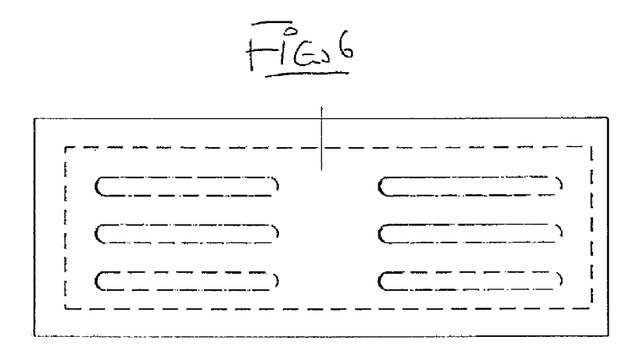

As shown in FIGS. 4, 5 and 6, the secure box can be designed such that ventilation occurs only when box is open. That is the lid 42 is connected by a mechanical coupling 50 to a slide plate 51 at the rear wall 53 of the box. The rear wall has opening 52 and the slide plate has opening 54 which are aligned in a raised position o the slide plate and misaligned in a lowered position so that the ventilation openings provided when the holes are aligned are closed when the door is closed. Operation of electronics within sealed box poses thermal issues, however ventilation holes that are always open are a security risk. That is the box can be fully enclosed with no ventilation access or a sliding door covers ventilation holes when the box is closed.

The box contains battery cells 55 which are charged when primary electronics internal to the lock box are inactive, wherein power is disconnected from mains and applied from the battery cells 55 for intended network use so as to decouple mains power from data equipment that potentially carries controlled access information.

Thus the box can be arranged so that when it is closed and locked, the ventilation openings are closed by the movement of the slide plate. At this time the power connection cord can be connected so that power is supplied to the components and to the battery cells. However when the door is opened for secure communications to take place, the ventilation openings are opened to allow cooling while the system is operating and the power is disconnected. At the same time the connection to the power cord can be shielded from electromagnetic emanations using conventional shielding arrangements. This renders the system secure in that all outside connections are removed allowing the system to be operated in a secure manner. One arrangement which can be used to disconnect the power supply is for the mechanical connection of the open door to the sliding door 51, or to a second sliding door, to open and close access to a power cord connection requiring the power cord to be disconnected when the door is opened.

The box is configured with mounting ears (not shown) for attachment to desk or other surface.

The arrangement herein thus provides a protective distribution system for the fiber optic cables 58, 59 where each fiber optic cable includes a at least one and generally a plurality of optical fibers including the fiber 45. Each fiber optic cable to be monitored has at least one monitoring fiber 6 connected to the monitoring system 11 arranged to transmit signals into said at least one monitoring fibers 6 and to detect changes in the signals indicative of movement of the monitoring fiber, as described in detail in the above referenced patents.

The secure box 18 box (shown in FIG. 3 at 40) is connected to the fiber optic cables and contains the component 41 for acting on the fiber optic cable. The cable 58 is connected to the box by a cable entry connector of conventional construction so as to enter the box for connection to the components 41. The box has a door 42 which can be closed to enclose the box.

As shown in FIG. 3, there is provided a connection 45 of the monitoring fiber 44 to the door 42 of the box whereby opening the door 42 of the box causes the monitoring fiber 44 to be moved. The monitoring system 11 is connected to the fiber 44 and is arranged to detect changes in the signal in the monitoring fiber 44 indicative of movement of the fiber caused by opening of the door.

The component 41 comprises one or more of a jumper, mechanical or optical splice, or loopback device.

As shown in the preferred arrangement of FIG. 2 there is provided a distribution panel 14 in a secured location and a plurality of fiber optic cables 58, 59 each connected to the distribution panel 14 at one end and to a respective user 19 at an opposed end where each user is associated with a respective box 18 forming a user lock box. The secure box is typically and preferably used in this location but other configurations of system can also make use of the box described herein.

The system can operate using different fibers for the first monitoring fiber 58 for detecting manipulation of the cable at a location remote from the box and a second monitoring fiber 44 for detecting opening of the door so that the detection of the opening of the door is analyzed as an independent event.

Alternatively, the monitoring fiber 58 arranged for detecting manipulation of the cable at a location remote from the box can also be used for detecting opening of the door so that the detection of the opening of the door is combined with the information that the fiber has been accessed, with the combined information used to influence response to an alarm.

As shown in FIG. 3 the component 41 in the box can be powered through a power cord by an outside power source and the box is arranged such that power to the component is disconnected at 48 if the box is opened. The power is disconnected at 48 by magnetic or mechanical containment 48A of an electrical connection and also the connection to the power cord is shielded at 48B from emanations when the power is disconnected.

As shown in FIG. 5, the box is designed such that ventilation occurs only when the box is open so that the sliding door 51 covers ventilation holes 52 when the box is closed.

The box contains battery cells 55 which are charged when primary electronics internal to the box are inactive, wherein power is disconnected from mains at 48 and applied from the battery cells for intended network use so as to decouple mains power from data equipment that potentially carries controlled access information.

The above description is given by way of example, and not limitation. Given the above disclosure, one skilled in the art could devise variations that are within the scope and spirit of the invention disclosed herein, including various ways of routing the alarm lines along with the data transfer line that is to be protected against intrusion. Further, the various features of the embodiments disclosed herein can be used alone, or in varying combinations with each other and are not intended to be limited to the specific combination described herein. Thus, the scope of the claims is not to be limited by the illustrated embodiments.

The invention claimed is:

1. A protective distribution system for fiber optic cables, comprising:
   a fiber optic cable including at least one optical fiber;
   said fiber optic cable being connected to components for use in transmission of secure data along the cable;
   a secure box having a door which can be opened to allow access to an interior of the secure box;
   at least one of the components for use in transmission of the secure data being located within the secure box and being accessible only when the door of the secure box is opened;
   the fiber optic cable entering the secure box at a position separate from the door and being connected to the component within the secure box;
   the fiber optic cable having at least one of said at least one optical fiber which acts as at least one monitoring fiber;
   said at least one monitoring fiber having parts extending along at least parts of the cable external to said secure box and having a portion inside said secure box;
   a monitoring system arranged to transmit signals into said at least one monitoring fiber and to detect changes in the signals indicative of movement of said at least one monitoring fiber both in said parts external to said secure box and said portion inside said secure box;
   wherein said portion of said at least one monitoring fiber within the secure box includes a loop extending up to and back from and connected to the door of the secure box at a position on the door so that opening of the door of the box causes the loop of the monitoring fiber to be moved and causes the monitoring system to detect changes in the signal in the monitoring fiber indicative of opening of the door.

2. The system according to claim 1 wherein the component comprises one or more of a jumper, mechanical or optical splice, or loopback device.

3. The system according to claim 1 wherein said at least one monitoring fiber comprises a first monitoring fiber in said parts external to said secure box and a second monitoring fiber comprising said portion internal to said secure box so that the detection of the opening of the door is analyzed as an independent event.

4. The system according to claim 1 wherein said at least one monitoring fiber comprises a single fiber so that the same monitoring fiber is in said external parts and in said internal portion, with combined information in said single fiber being used to influence response to an alarm.

5. The system according to claim 1 wherein the monitoring fiber also carries data.

6. The system according to claim 1 wherein the monitoring fiber does not carry data.

7. The system according to claim 1 further comprising a power source exterior to the secure box having a power connection entering the box for providing power to the component located within the secure box;
   at least one battery contained within the secure box which is charged when the door is closed;
   and a coupling responsive to opening of the door to disconnect the power connection so that said at least one component located within the secure box is unconnected to the power source exterior to the secure box when the box is opened.

8. The system according to claim 7 wherein the power connection is disconnected by magnetic or mechanical containment of an electrical connection.

9. The system according to claim 7 wherein power connection to the power source is shielded from emanations when the power is disconnected.

10. The system according to claim 1 further comprising at least one ventilation opening in the box separate from said door:
    a closure for closing said at least one ventilation opening;
    and a coupling responsive to opening of the door to open the closure of the ventilation opening when the door is opened and responsive to closing of the door to close the closure of the ventilation opening when the door is closed;
    wherein the secure box is designed such that ventilation occurs only when the secure box is open.

11. The system according to claim 10 wherein a sliding door covers said at least one ventilation opening when the box is closed.

12. A protective distribution system for fiber optic cables, comprising:
    a fiber optic cable including a plurality of optical fibers;
    said fiber optic cable being connected to components for use in transmission of secure data along the cable;
    a secure box having a door which can be opened to allow access to an interior of the secure box;
    at least one of the components for use in transmission of secure data being located within the secure box and being accessible only when the door of the box is opened;
    the fiber optic cable having at least one of said at least one optical fibers which acts as at least one monitoring fiber;
    a monitoring system arranged to transmit signals into said at least one monitoring fiber and to detect changes in the signals indicative of movement of said at least one monitoring fiber;
    a power source exterior to the secure box having a power connection entering the box for providing power to the component located within the secure box;
    at least one battery contained within the secure box which is charged when the door is closed;
    and a coupling responsive to opening of the door to disconnect the power connection so that said at least one component located within the secure box is unconnected to the power source exterior to the secure box when the box is opened.

13. The system according to claim 12 wherein the power connection is disconnected by magnetic or mechanical containment of an electrical connection.

14. The system according to claim 12 wherein power connection to the power source is shielded from emanations when the power is disconnected.

15. The system according to claim 12 further comprising at least one ventilation opening in the box separate from said door;
    a closure for closing said at least one ventilation opening;
    and a coupling responsive to opening of the door to open the closure of the ventilation opening when the door is opened and responsive to closing of the door to close the closure of the ventilation opening when the door is closed;

wherein the secure box is designed such that ventilation occurs only when the secure box is open.

16. The system according to claim 15 wherein a sliding door covers said at least one ventilation opening when the box is closed.

17. A protective distribution system for fiber optic cables, comprising:
a fiber optic cable including a plurality of optical fibers;
said fiber optic cable being connected to components for use in transmission of secure data along the cable;
a secure box having a door which can be opened to allow access to an interior of the secure box;
at least one of the components for use in transmission of secure data being located within the secure box and being accessible only when the door of the box is opened;
the fiber optic cable having at least one of said at least one optical fibers which acts as at least one monitoring fiber;
a monitoring system arranged to transmit signals into said at least one monitoring fiber and to detect changes in the signals indicative of movement of said at least one monitoring fiber;
at least one ventilation opening in the box separate from said door;
a closure for closing said at least one ventilation opening;
and a coupling responsive to opening of the door to open the closure of the ventilation opening when the door is opened and responsive to closing of the door to close the closure of the ventilation opening when the door is closed;
wherein the secure box is designed such that ventilation occurs only when the secure box is open.

18. The system according to claim 17 wherein a sliding door covers said at least one ventilation opening when the box is closed.

19. A protective distribution system for fiber optic cables, comprising:
a distribution panel in a secured location and a plurality of fiber optic cables each connected to the distribution panel at one end and arranged to provide a connection to a respective user at an opposed end;
each fiber optic cable including at least one optical fiber;
each fiber optic cable having at its respective opposed end a secure box containing at least one component at said opposed end of the cable for said connection to the respective user;
each said secure box having a door which can be opened to allow access to an interior of the secure box for accessing said at least one component which is accessible only when the door of the box is opened;
each fiber optic cable entering the respective box at a position separate from the door and being connected to said at least one component within the box;
each fiber optic cable having at least one of said at least one optical fiber which acts as at least one monitoring fiber;
said at least one monitoring fiber having parts extending along at least parts of the cable external to said secure box and having a portion inside said secure box;
a monitoring system arranged to transmit signals into said at least one monitoring fiber of said fiber optic cables and to detect changes in the signals indicative of movement of said at least one monitoring fiber both in said parts external to said secure box and said portion inside said secure box;
wherein said portion of said at least one monitoring fiber within the secure box includes a loop extending up to and back from and connected to the door of the secure box at a position on the door so that opening of the door of the box causes the loop of the monitoring fiber to be moved and causes the monitoring system to detect changes in the signal in the monitoring fiber indicative of opening of the door.

20. The system according to claim 19 further comprising at least one ventilation opening in the box separate from said door;
a closure for closing said at least one ventilation opening;
and a coupling responsive to opening of the door to open the closure of the ventilation opening when the door is opened and responsive to closing of the door to close the closure of the ventilation opening when the door is closed;
wherein the secure box is designed such that ventilation occurs only when the secure box is open.

21. The system according to claim 19 further comprising a power source exterior to the secure box having a power connection entering the box for providing power to the component located within the secure box;
at least one battery contained within the secure box which is charged when the door is closed;
and a coupling responsive to opening of the door to disconnect the power connection so that said at least one component located within the secure box is unconnected to the power source exterior to the secure box when the box is opened.

* * * * *